Sept. 20, 1971  G. GOLDFARB  3,606,248
LIFTING MEANS FOR AUTOMOBILES
Filed July 7, 1969
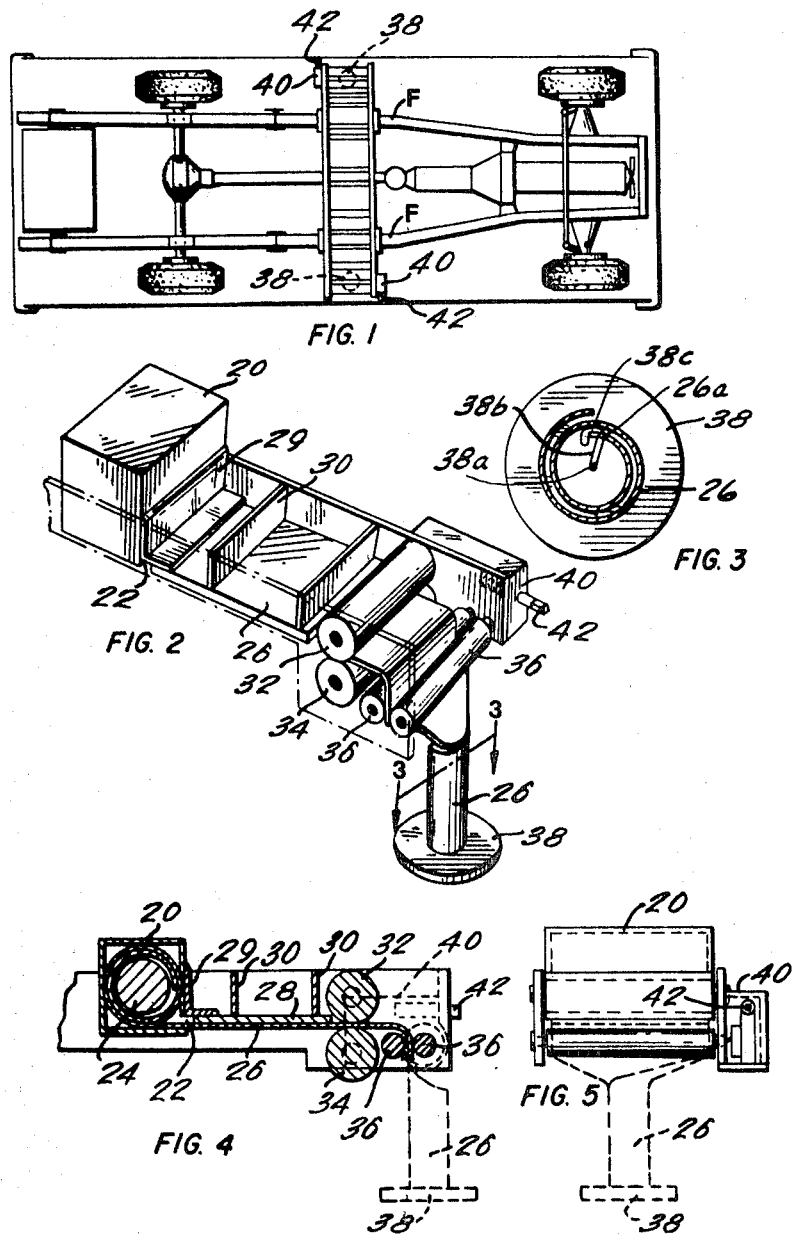
INVENTOR
George GOLDFARB
ATTORNEY United States Patent Office  
3,606,248  
Patented Sept. 20, 1971

3,606,248
LIFTING MEANS FOR AUTOMOBILES
George Goldfarb, 5700 Smart Ave.,
Cote St.-Luc, Quebec, Canada
Filed July 7, 1969, Ser. No. 839,334
Int. Cl. B60s 9/02
U.S. Cl. 254—86R                                     11 Claims

ABSTRACT OF THE DISCLOSURE

A lifting device such as an automobile jack for displacing an apparatus relative to a given point, the device having a pretempered spring capable of coiling axially on itself when in an unrestrained condition. There are provided means such as guide rollers for flattening a portion of the spring for storage purposes, with drive means such as drive rollers for retracting and advancing the spring from the housing. The end of the spring is preferably provided with a bearing surface such as a metal plate for providing an abutment surface.

---

This invention relates to an apparatus and method.
More particularly, this invention relates to an apparatus and method for displacing an object relative to another object or a fixed point.

Although the present invention finds application in many fields, the application will be described with reference to a particularly preferred embodiment of the invention, where it is employed as a lifting device—e.g. an automobile jack.

In the art of automobile jacks, there are various well-known devices for lifting an automobile for changing tires, etc. Such devices are mechanical levers or hydraulic systems which abut or act on normally the bumpers of an automobile.

Almost all of the well-known lifting devices used for such purposes, in the prior art, are separate devices which when required, are assembled and physically placed under the automobile bumper, and then through the action of the jack, the automobile is lifted relative to the ground.

With this invention, applicant has provided a device adapted to be incorporated into the structure of an automobile, whereby the device upon actuation, will displace the automobile relative to a given point—e.g. the ground.

Thus, an apparatus according to this invention includes the moveable, coilable, tempered high tensile strength steel spring, housing means for storing the spring, guide means in advance of the housing means, drive means preferably in advance of said guide means for retracting and advancing said spring from said housing means, and support means attachable to the leading end of said spring. The device of the present invention will preferably be incorporated into the structure of a vehicle at the front and rear ends, or opposite sides, to displace the automobile. Depending on the type of automobile, it may be desirable to incorporate a pair of applicant's devices at both the front and rear ends so that each front and rear side may be lifted, or in other uses, at opposite sides.

The apparatus of the present invention provides many advantageous features over prior art automobile jacks. Some of these features include, for example, the elimination of the assembly and setting up of a conventional type jacking system, a more positive stable jacking device, and the elimination of manual requirements to jack-up an automobile.

The tempered steel spring employed in the apparatus of this invention is of a particular type, and is one which possesses certain characteristics. These characteristics are that the spring is capable of itself, of coiling in a width wise direction when freed from any restraining force, to an extent such that the spring in a coiled condition is substantially inflexible—i.e. rigid, and is capable of supporting a load to be acted on; the spring is also one which is capable of being uncoiled into a flexible storable condition by mechanical means. Further, the spring will also be of a length suitable for the purpose intended—i.e. to displace a given object the desired distance relative either to a fixed point or a second given object.

As mentioned above, the spring employed in the present invention is one which when not placed under restraint, coils upon itself in the width wise direction, thereby forming a rigid column possessing many times the strength in an axial direction to the direction of coiling, thereby providing the apparatus of the present invention with very high load bearing capabilities. Tempered steel springs, capable of coiling in the width-wise direction, can be manufactured according to the techniques known in the art of spring manufacture, and their thickness, width and length will vary according to different factors such as the weight load to be lifted, the type of material from which the spring is made, etc. A typical spring which would be empoyed in applicant's device, for lifting an average automobile, would be made of pretempered steel, such as SAE 1095 grade spring steel, blue tempered, which would have a width of ten inches by approximately 24 inches long, and a thickness of 0.0149 inch. The spring, tempered according to known technology, in this instance, would be such that it would coil to a 2½ inch diameter tube or colume when free from restraint.

The drive rollers for retracting and advancing the spring can be any suitable means for accomplishing this purpose. These drive rollers, for example, may be in the form of rubber or steel rollers having a width sufficient to maintain the spring in a flattened condition. The drive rollers will be mounted so that the distance therebetween will be sufficient to positively engage the spring. It will be appreciated that either one or both drive rollers may be positively driven.

The drive rollers may be actuated by any suitable means including an electric motor, or alternately, they may be hydraulically or manually operated. In the latter case, a gear arrangement may be used whereby manual rotation of the gears through a cranking system will be effected to rotate the rollers.

The guide rollers serve to orient the flattened spring and if required, to reverse direction of the spring. In the case of a vehicle jack, where the spring is mounted in a generally parallel relation to the underside of the vehicle, the guide rollers will be effected to downwardly direct the spring.

The guide rollers can be of any suitable material normally employed for this purpose. Thus, they may be either hard rubber or metal. They will, of course, have a width at least as large as the width of the spring in a flattened condition.

In the case of both the drive rollers and the guide rollers, there are preferably included a pair of rollers mounted in parallel opposed relationship.

The housing for storing the spring when in a flattened condition is preferably included in the apparatus although it is not an essential component. The housing, if included, may be any suitable type of unit for this purpose and preferably includes a take-up roller upon which the spring is connected to. The roller will preferably be spring loaded whereby the tempered steel spring of applicant's apparatus will be self-winding upon the roller.

In the case of a vehicle jack, the end of the tempered steel spring, includes a bearing surface adapted to abut the ground and provide a base for the spring in a coiled condition. The end of the spring is preferably rotatably secured to the bearing plate whereby the bearing plate, when it abuts the ground, will firmly rest on the ground.

The bearing plate may be of any suitable material for the purpose desired—e.g. metal, and is a sufficient width and thickness to support a vehicle when it is desired to displace the vehicle from the ground.

If desired, the apparatus of this invention may include steel supporting plates between the housing and the drive rollers for the purpose of maintaining the spring in a flattened condition. These supporting plates can be thin metallic strips of a width at least as large as the width of the spring.

Having thus generally described the invention, reference will now be made to the accompanying drawings, illustrating a preferred embodiment of the applicant's invention and in which:

FIG. 1 is a bottom plan view of a vehicle embodying an apparatus according to this invention;

FIG. 2 is a perspective view of an apparatus according to this invention;

FIG. 3 is a section taken along the line 3—3 of FIG. 2;

FIG. 4 is a section taken along the line 4—4 of FIG. 2; and

FIG. 5 is an end view of the apparatus of FIG. 2.

Referring now to the drawings, a device according to this invention is separately shown in FIG. 2 and includes a cabinet generally indicated by reference numeral 20 in the form of a storage housing of suitable material, for retaining the tempered coil when not in use. Housing 20 includes an aperture 22 in one side wall thereof, permitting winding and unwinding of the coil into and out of the housing. Mounted in housing 20 is a rotatable roller 24 (spring-loaded), about which the coil may be wound.

The pre-tempered coil indicated generally by reference numeral 26 is, as hereinbefore described, a special type of coil. Specifically, the coil employed is a pre-tempered steel strip which in this case has a width of approximately 10 inches and a length of approximately 24 inches, with a thickness of 0.0149 inch. As was hereinbefore mentioned, the coil 26 is capable, on its own initiative, of coiling in an axial direction when not held in a flattened condition. To this end, the apparatus includes a supporting base 28 adapted to retain the coil in a flattened condition, with supports 30 mounting the base 28 to a vehicle frame F. When wound about roller 24, coil 26 is likewise in a flattened condition. The supporting base 28 and housing 20 are connected together, for supporting purposes by means of an L-shaped bracket 29.

The apparatus includes a pair of cooperating drive rollers 32 and 34 spaced apart a distance sufficient to positively engage the coil 26 so as to wind or unwind the coil from the roller 24.

Located in advance of the drive rollers 32 and 34 are a pair of guide rollers 36, which in this case are mounted in a substantially right-angled relationship to the drive rollers 36 whereby the coil 26, upon being unwound is downwardly directed towards the bottom of the vehicle.

After passing through guide rollers 36, and with no retaining force placed on the coil 26, the coil 26 is free to coil about its axis to assume the configuration shown in FIG. 3. In the present instance, the coil employed is one which, when coiled, assumes a configuration wherein the coil is in the form of two convolutions about the vertical axis. In the type of application shown in the embodiments of the drawings, the diameter of the coil is approximately 3 inches in its coiled shape.

Attached to one end 26a of the coil 26 through a hook 38b is a supporting or bearing base 38 consisting of a light weight circular metal disk. The base 38 is rotatably attached at 38a to radial hook 38b connected at hooked end 38c to the coil 26 at end 26a whereby the coil 26 is free to rotate on the base 38. The base 38 may for instance be retained by hooks (not shown) attached to the coil 26.

The drive rollers 32 and 34 may be driven in unison, or one of the rollers 32 and 34 may be solely driven. In the embodiment shown, the drive roller 34 is the power roller, driven by a mechanical system comprising a gear box 40 and a rotatable worm drive 42 connected to the gear box. The gears in the gear box 40 are connected to the lower roller 34 according to conventional techniques.

When the band 26 leaves the guide rollers 36, it immediately begins to coil due to the prestressing. Thus, the flattened section immediately at the outlet of the nip between the rolls 36 is the point of minimum transverse structural strength. As the band 26 leaves these rolls, it tends to curve on itself axially, thereby increasing its moment of inertia and increasing its structural strength. As the band progresses from the rollers 26, strength is further increased by further coiling upon itself. Thus, when its bottom end contacts the surface, there is a substantially cylindrical section connected to the very short flat section positioned immediately at the outlet from rolls 36 by a tapering section in which the band 26 is being coiled. In other words, there is a substantially rigid section formed by the coiled and tapered intermediate section interposed between the ground and the point of connection with the vehicle, which point of connection will have the minimum transverse structural strength. Obviously, the size and strength characteristics of the band 26 will be correlated with the load to be lifted so that proper operation occurs. This is determined partly by the strength and partly by the prestressed characteristics of the band 26.

Two separate apparati illustrated in FIG. 2 are shown in FIG. 1, mounted on the underside of a vehicle, in the central area thereof. In this case, both apparati are mounted in alignment with each other, whereby one such apparatus is adapted to lift one side of the vehicle, the other apparatus being adapted to lift the opposite side of the vehicle. The apparatus of FIG. 2 is secured to the vehicle frame F by suitable means, e.g. brackets and bolts. As will be understood by those skilled in this art, suitable actuation means for actuating the electric motor 40 are employed, which means will normally be located in the vehicle interior where they are readily accessible.

It will be understood that various modifications can be made to the apparatus of this invention without departing from its spirit and scope.

I claim:

1. A device for displacing an object relative to a given point comprising a spring capable of coiling axially upon itself when not restrained, means for retaining at least a portion of said spring in a flattened condition, drive means for causing said spring to advance and retract; and means connected to one end of said spring for providing a bearing surface.

2. A device as defined in claim 1 for displacing an object relative to a given point including a housing, a pair of guide rollers for retaining said spring in a flattened condition, a pair of drive rollers adapted to advance and retract said spring from said housing, means for driving said rollers, said spring having a bearing surface at the end thereof.

3. A device suitable for lifting a vehicle comprising a housing, a rotatable roller in said housing, a spring capable of coiling upon itself when not held in a flattened condition, a pair of guide rollers adapted to guide said spring, a pair of drive rollers adapted to retract and advance said spring from said housing, said guide rollers being operative to displace said spring in a direction downwardly extending from the undersurface of a vehicle, said spring being free to coil upon itself in advance of said guide rollers, and a bearing surface connected to the leading end of said spring.

4. A device as defined in claim 1, wherein said spring is a steel spring capable of coiling upon itself into a coil axially extending to the length of the spring.

5. A device as defined in claim 2, wherein said spring is a steel spring capable of coiling upon itself into a coil axially extending to the length of the spring.

6. A device as defined in claim 3, wherein said spring is a steel spring capable of coiling upon itself into a coil axially extending to the length of the spring.

7. A device as defined in claim 3, wherein said drive rollers are actuated by hydraulic, electrical or mechanical means.

8. A device as defined in claim 3, wherein said drive rollers are driven by means of a gear box connected to at least one of said rollers, and means in said gear box for rotating said gears.

9. A vehicle having the device of claim 1 incorporated therein.

10. A vehicle having the device of claim 2 incorporated therein.

11. A vehicle having the device of claim 3 incorporated therein.

References Cited

FOREIGN PATENTS 26,026   11/1963   Germany.

LESTER M. SWINGLE, Primary Examiner

D. R. MELTON, Assistant Examiner